United States Patent [19]
Nupnau

[11] 3,724,775
[45] Apr. 3, 1973

[54] FILM REEL SUPPORT ASSEMBLY FOR PROJECTORS

[75] Inventor: Arthur E. Nupnau, Chicago, Ill.

[73] Assignee: Bell & Howell Company, Chicago, Ill.

[22] Filed: Apr. 13, 1970

[21] Appl. No.: 27,551

[52] U.S. Cl. ................. 242/180, 274/4 G, 352/123
[51] Int. Cl. ........................ G03b 1/04, G11b 15/32
[58] Field of Search .................. 242/197–200, 180; 352/123; 274/4 F, 4 G

[56] References Cited

UNITED STATES PATENTS 3,168,993  2/1965  Mathieu ........................ 242/199 X
3,383,156  5/1968  Fried et al. ........................ 352/123

Primary Examiner—Leonard D. Christian
Attorney—William F. Pinsak, John E. Peele, Jr., Kenneth W. Greb and William K. Serp

[57] ABSTRACT

A support assembly adaptable for supporting varying sized reels of film at a projection station on a motion picture projector. The support assembly includes a gate member having a first position to permit projecting any one of a plurality of like sized reels of film supported on the projector and having a second position to permit projecting a selected one of varying sized reels of film.

5 Claims, 4 Drawing Figures

Inventor:
Arthur E. Nupnau

Inventor:
Arthur E. Nupnau

FILM REEL SUPPORT ASSEMBLY FOR PROJECTORS

The present invention relates to a motion picture projector and more particularly to a support assembly adaptable for supporting varying sized reels of film at a projection station and adaptable for supporting a plurality of like sized reels of film.

Known motion picture projector support assemblies adaptable for supporting varying sized reels of film at a projection station are capable of supporting only one reel of film at a time. Motion picture projectors of this type have the disadvantages of not being adaptable for supporting a plurality of like sized reels of film such as a group of cartridges carrying 50 foot reels of film.

It is an object of the present invention to provide an efficient and economical support assembly for a motion picture projector adaptable for projecting any one of a plurality of like sized reels of film supported on the projector and adaptable for projecting a selected one of varying sized reels of film.

It is another object of the present invention to provide a support assembly for a motion picture projector having a gate member shiftable from a first position where the gate member cooperates with a frame for supporting a group of cartridges carrying 50 foot reels of film to a second position where the gate member is capable of supporting one of varying sized reels of film.

These as well as other objects of this invention will be readily understood by those skilled in the art with reference to the following specification and accompanying figures.

Figure 1:
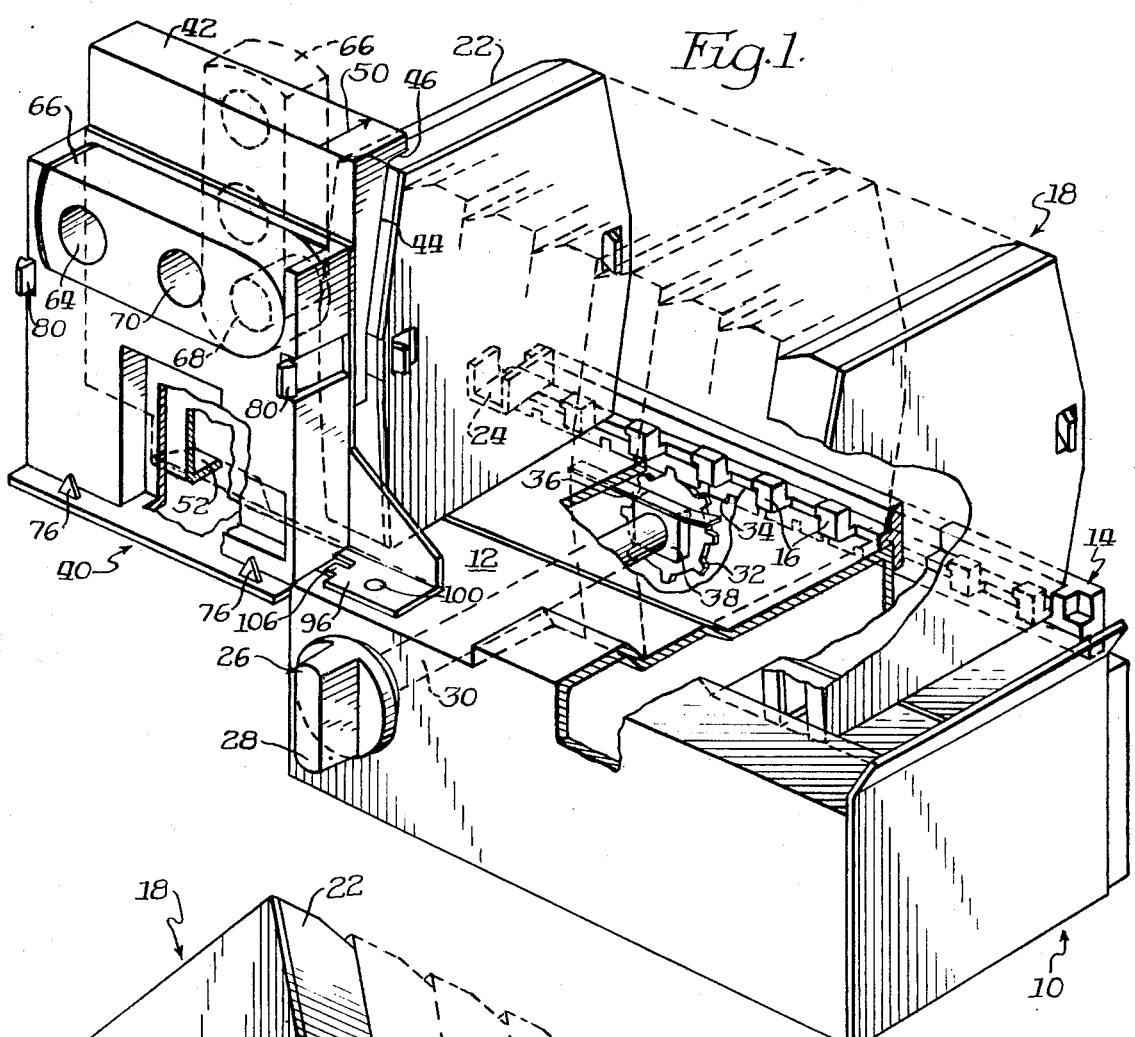
FIG. 1 is a left rear perspective view of the present support assembly showing the shiftable gate in a first position cooperating with a frame for supporting a group of cartridges carrying like sized reels of film.
Figure 2:
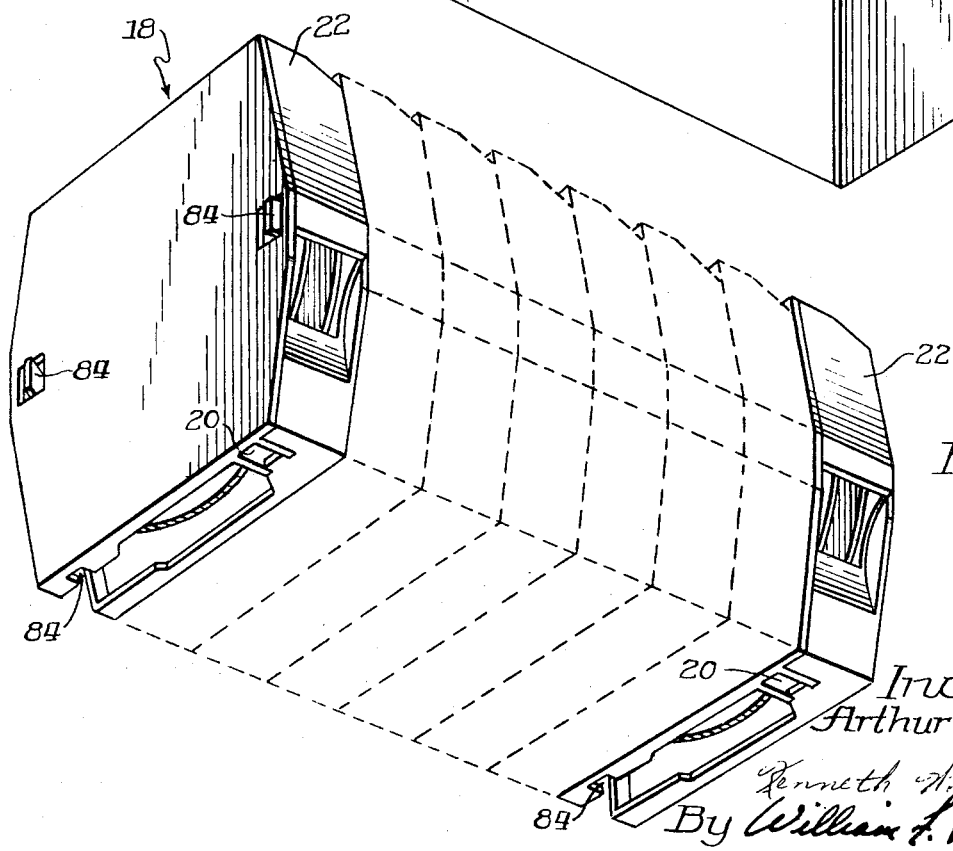
FIG. 2 is a bottom perspective view of a group of eight stacked and interlocked film cartridges which may be supported on the projector.

Referring to FIG. 1, a frame means 10 is considered as a portion of a motion picture projector which has the necessary features for withdrawing film from any sized reel of film located at a projection station and for projecting that film for viewing. The frame 10 has a top surface 12 and an attaching member 14 slidably arranged along the one side thereof. The attaching member 14 has a plurality of hook shaped members 16 integrally extending upwardly therefrom. A stack 18 of interlocked cartridges carrying like sized reels of film, such as, reels on which 50 foot lengths of film is wound is supported on the frame 10 by having one portion rest on the top surface 12 and another portion rest on the attaching member 14. Each hook shaped member 16, as shown in FIG. 1, extends into an opening 20, in a respective cartridge 22 as shown in FIG. 2. An abutment lever 24 is pivotally mounted on the attaching member 14 and is operable to shift the stack 18 of cartridges into engagement with the hook shaped members 16 to fix the stack to attaching member 14.

A drive means 26, as viewed in FIG. 1, is coupled to the attaching member 14 for moving the stack 18 of cartridges relative to the frame 10. The drive means 26 includes a knob 28 rigidly assembled to one end of a shaft 30 and a gear 32 rigidly assembled to the opposite end of the shaft 30. The gear 32 engages a toothed rack 34 integrally formed from the attaching member 14. A leaf spring 36 cooperates with a detent member 38 to hold the attaching member 14 in any of its selected positions. Turning the knob 28 in either direction will move the cartridges relative to the frame 10.

Figure 3:
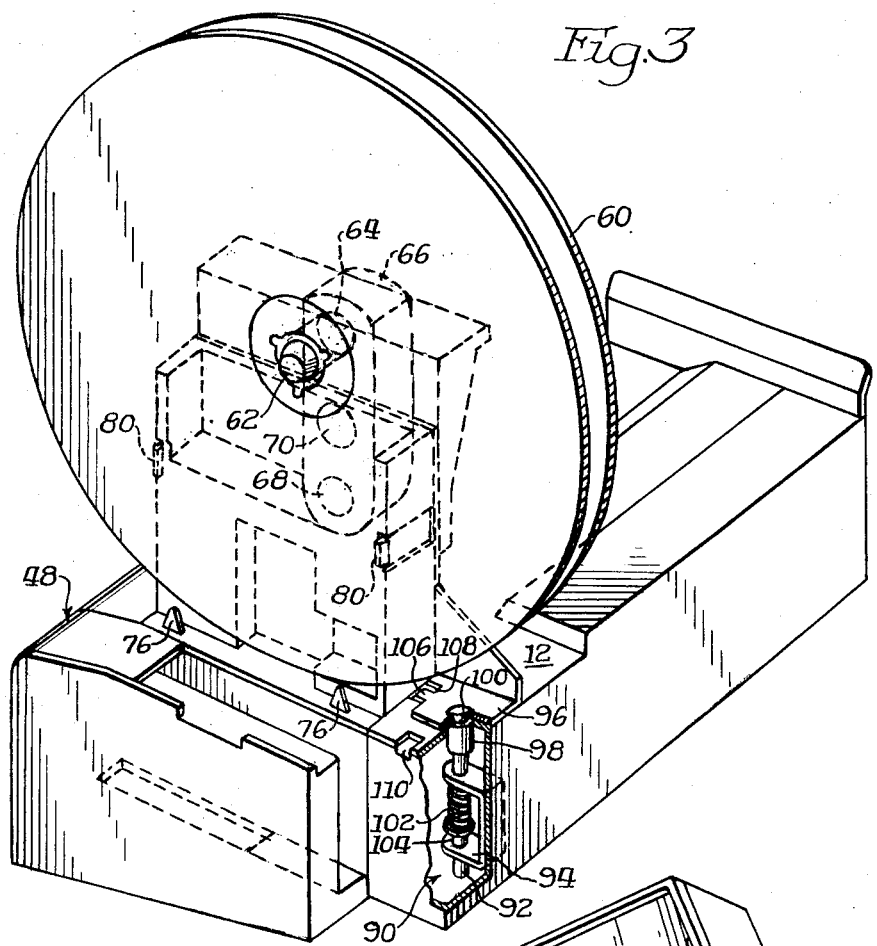
FIG. 3 is a right front perspective view showing the shiftable gate in a second position for supporting a selected one of varying sized reels of film.

A gate member, generally designated by the numeral 40, is pivotally supported on the frame 10 and is shiftable from a first position as shown in FIG. 1 to a second position as shown in FIG. 3. In the first position, the gate member 40 has an upper guide 42 that provides a side surface 44 for guiding the stack 18 of cartridges in a path normal to the projection station. The upper guide 42 also provides an upper surface 46 to prevent the cartridges from being displaced upwardly when positioned under the upper guide 42. The cartridge 22, shown in alignment with the upper guide 42, is located at the projection station 48, FIG. 3, of the projector as indicated by an arrow 50, FIG. 1. In this position, a film withdrawing mechanism (not shown) extends into the cartridge to feed the film into the projector. The upper surface 46 prevents the cartridge 22 from being displaced upwardly by the film withdrawing mechanism. A support plate 52 extends from the gate member 40 to cooperate with the upper guide 42 to guide the stack 18 of cartridges during movement.

This support assembly is capable, therefore, of guiding a stack 18 of cartridges 22 carrying like sized reels of film to and beyond the projection station 48 and in either direction relative to the projection station 48.

Referring to FIG. 3, the gate member 40 is located in the second position for supporting a selected one of varying sized reels of film at the projection station 48. An open reel of film 60 is supported on a spindle 62 which extends into an upper spindle opening 64 in an arm 66 pivotally supported on the gate member 40 by a post 68. The reel of film 60 is referred to as an open reel to identify a reel that is not carried in a cartridge. Film reel 60 illustrates the largest reel capable of being supported by the present support assembly. A spindle opening 70 supports a smaller size open reel of film. The arm 66 is pivoted to an ineffective position as shown in solid lines in FIG. 1 when it is desirable to mount varying sized cartridges of film rather than varying sized open reels of film.

Figure 4:
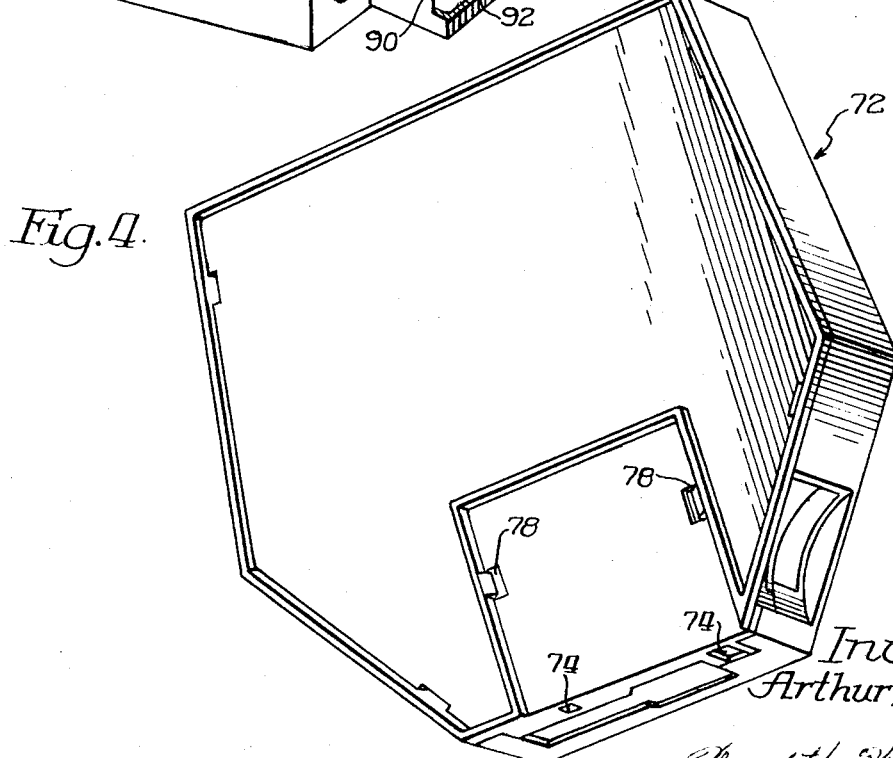
FIG. 4 is a rear perspective view of a cartridge for carrying a 400 foot reel of film.

Varying sized cartridges are available for carrying different sized film reels. A cartridge 72, FIG. 4, carries a typical 400 foot reel of film. Another size, not shown, carries the typical 200 foot reel of film. Each of these cartridges have provisions for being securely attached to the gate member 40. The provisions include a pair of alignment apertures 74 in the under side of cartridge 72 which are placed over alignment pins 76 carried by the gate member 40. A pair of detent apertures 78 are located on the back side of the cartridge 72 and are placed over a pair of flexible tabs 80 extending from the gate member 40. The tabs 80 hold the back side of the cartridge 72 against the front surface 82 of the gate member 40.

The cartridge 22 also has provisions for being securely attached to the gate member 40. Also shown in FIG. 2, the cartridge 22 has alignment openings 84 and 20, appropriately spaced to be placed over alignment pins 76. The cartridge 22 also has flexible tabs 84 extending from the back side thereby, which tabs cam over the flexible tabs 80 on the gate member 40 for thereby securely attaching a 50 foot reel cartridge to the gate member 40 when the gate member 40 is in the second position.

It can now be seen that a selected one of varying sized open reels of film, one being open reel 80, or a selected one of varying sized film reel cartridges, one being cartridge 72, can be attached to the gate member 40 when the gate member is in the second position for supporting a reel of film at the projection station 48.

Referring again to FIG. 3, a detent means 90 is connected to the gate member 40 and to the frame 10 to hold the gate member 40 alternatively and in the first position or in the second position. A post 92 is vertically supported in a bracket 94 which is rigidly assembled to the frame 10 by any common means. The gate member 40 has a support plate 96 connected to the post 92 between a shoulder 98 and a headed over end 100. A compression spring 102 is located between the bracket 94 and a keeper 104 secured to the post 92 for biasing the post 92 and consequently the gate member 40 downwardly against the top surface 12. A finger 106 formed downwardly from the support plate 96 seats into a rectangular shaped opening 108 in the top surface 12 for holding the gate member 40 in the second position as shown in FIG. 3. The finger 106 seats in a notch 110 in the top surface 12 for holding the gate member 40 in the first position as shown in FIG. 1.

The gate member 40 is shifted from the first position of FIG. 1 to the second position of FIG. 2 by lifting on the upper guide 42 which lifts the post 92 against the tension of spring 102 until the finger 106 is removed from the notch 110. The gate member 40 is then pivoted about the axis of the post 92 until the finger 106 is in alignment with the opening 108. Releasing the upper guide 42 permits the spring 102 to bias the gate member into the second position.

What is claimed is:

1. A support assembly adaptable for supporting varying sized reels of film at a projection station on a motion picture projector comprising:
   supply means carrying a plurality of like sized reels of film;
   frame means for supporting said supply means for movement relative thereto; and
   support means having a first position cooperating with said frame means for guiding said supply means to and beyond the projection station to permit projection of any one of said plurality of like sized reels of film, said support means being a pivotally mounted gate member shiftable to and from said first position and a second position for supporting a selected one of varying sized reels of film at the projection station.

2. A support assembly as defined in claim 1, wherein said support means includes cartridge attaching means for supporting a selected one of varying sized film reel cartridges when said support means is in said second position.

3. A support assembly as defined in claim 1, wherein said support means includes an arm movable relative to said support means to a position for supporting a selected one of varying sized reels of film when said support means is in said second position.

4. A support assembly as defined in claim 1, wherein said supply means is a plurality of film reel cartridges.

5. A support assembly as defined in claim 1, further comprising detent means for holding said support means in said first position and in said second position.

* * * * *